United States Patent [19]

Perry

[11] 4,272,088
[45] Jun. 9, 1981

[54] MECHANICAL CONCENTRIC SUPPORT

[76] Inventor: Fred Perry, 1340 Cedar St., Berkeley, Calif. 94702

[21] Appl. No.: 46,644

[22] Filed: Jun. 8, 1979

[51] Int. Cl.³ .............................................. B23B 5/22
[52] U.S. Cl. .................................. 279/114; 269/283; 279/123
[58] Field of Search ............... 279/1 A, 2 R, 114–116, 279/123; 82/44; 269/47, 48.1, 279, 280, 283, 88

[56] References Cited

U.S. PATENT DOCUMENTS

| 1,473,464 | 11/1923 | Church | 279/114 |
| 2,809,044 | 10/1957 | Landreth | 279/2 |
| 3,322,434 | 5/1967 | McClung et al. | 279/123 |

Primary Examiner—Robert C. Watson
Attorney, Agent, or Firm—Michael Thomas

[57] ABSTRACT

A mechanical concentric support device for use on machine tools such as lathes, precision grinders and the like, for either internal or external engagement of the workpiece by radially extensible support shafts driven by a scroll mechanism. The key connection for the scroll mechanism is located on one of the circular faces of the device to permit close-fitting internal support of cylindric workpieces, and adapters are shown for both internal and external gripping of workpieces of a wide range of diameters both larger and smaller than the diameter of the support device.

1 Claim, 10 Drawing Figures

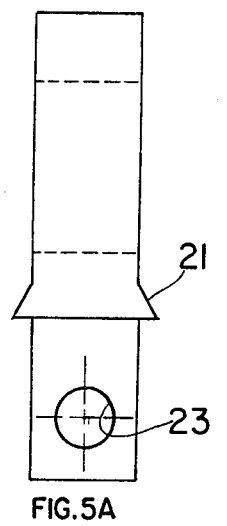
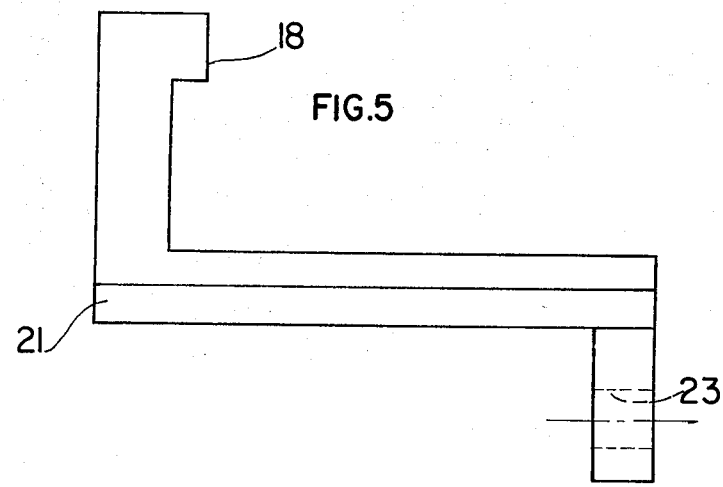
FIG.5
FIG.5A
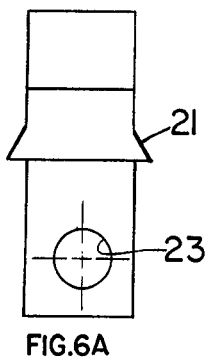
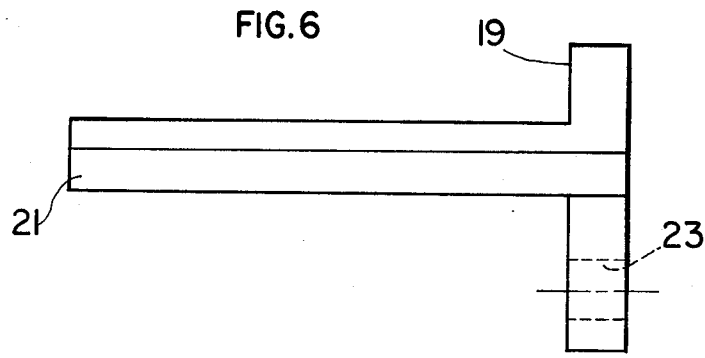
FIG.6
FIG.6A
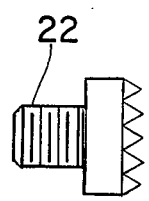
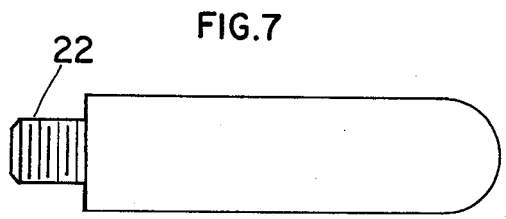
FIG.8
FIG.7

MECHANICAL CONCENTRIC SUPPORT

BACKGROUND OF THE INVENTION

This invention relates to a Mechanical Concentric Support Device, and more particularly to a device for concentrically supporting a workpiece on a machine tool.

The prior art in this area includes a wide variety of devices such as lathe chucks and live and dead centers. However, such devices have generally been poorly adapted for internal support of a workpiece, and they lack flexibility in adapting to either external or internal support of workpieces of widely varying sizes. Prior art devices have also generally placed their key connector for operating their jaw-driving mechanisms or scroll on one of the cylindric surfaces of the device, rendering use either difficult or impossible for internal support of workpieces only slightly larger in internal diameter than the diameter of the device itself. Furthermore, many prior art devices have been intended for use only at what would be the driving end of the machine tool, such as the headstock of a lathe.

SUMMARY

The present invention is intended for use for either internal or external support of a wide variety of sizes of workpieces to be machined or gauged, with the key connector for driving the scroll mechanism located for ease of access is nearly all machining setups. The support device of the present invention is adapted for use in both driving and non-driving positions on a machine tool, such as, but not limited to, either the headstock or the tailstock of a lathe.

Accordingly, it is a principal object of the present invention to provide a mechanical concentric support device of the character described having flexibility of adaptation to internal or external gripping support of a wide range of workpiece sizes.

It is a further principal object of the present invention to provide a support device of the character described having maximal access to the key connector for driving the scroll mechanism in varying work setups.

A still further object of the present invention is to provide a support device of the character described which is adapted to permit internal and face-on machining of the workpiece immediately adjacent to the support device while supporting the workpiece internally.

Yet another object of the present invention is to provide a support device of the character described yielding increased accuracy of machining by increased supporting of the workpiece immediately adjacent to the location of the machining.

Further objects and advantages of the present invention will become apparent as the specification progresses, and the new and useful features thereof will be fully defined in the claims attached hereto.

BRIEF DESCRIPTION OF THE DRAWINGS

The preferred forms of the present invention are illustrated in the accompanying drawings, forming part of this specification, in which:

FIG. 5 is a side elevation view of one of the shaft adapters of the present invention;

FIG. 5A is an end elevation view of the shaft adapter of FIG. 5;

FIG. 6 is a side elevation view of another embodiment of shaft adapter of the present invention, for external gripping;

FIG. 6A is an end elevation view of the shaft adapter embodiment of FIG. 6;

FIG. 7 is a side elevation view of a further embodiment of a shaft adapter of the present invention, for extending the radial reach, and FIG. 8 is a side elevation view of yet another embodiment of a shaft adapter of the present invention, for driving engagement with the workpiece and for workpieces of rough internal surface.

Figure 1:
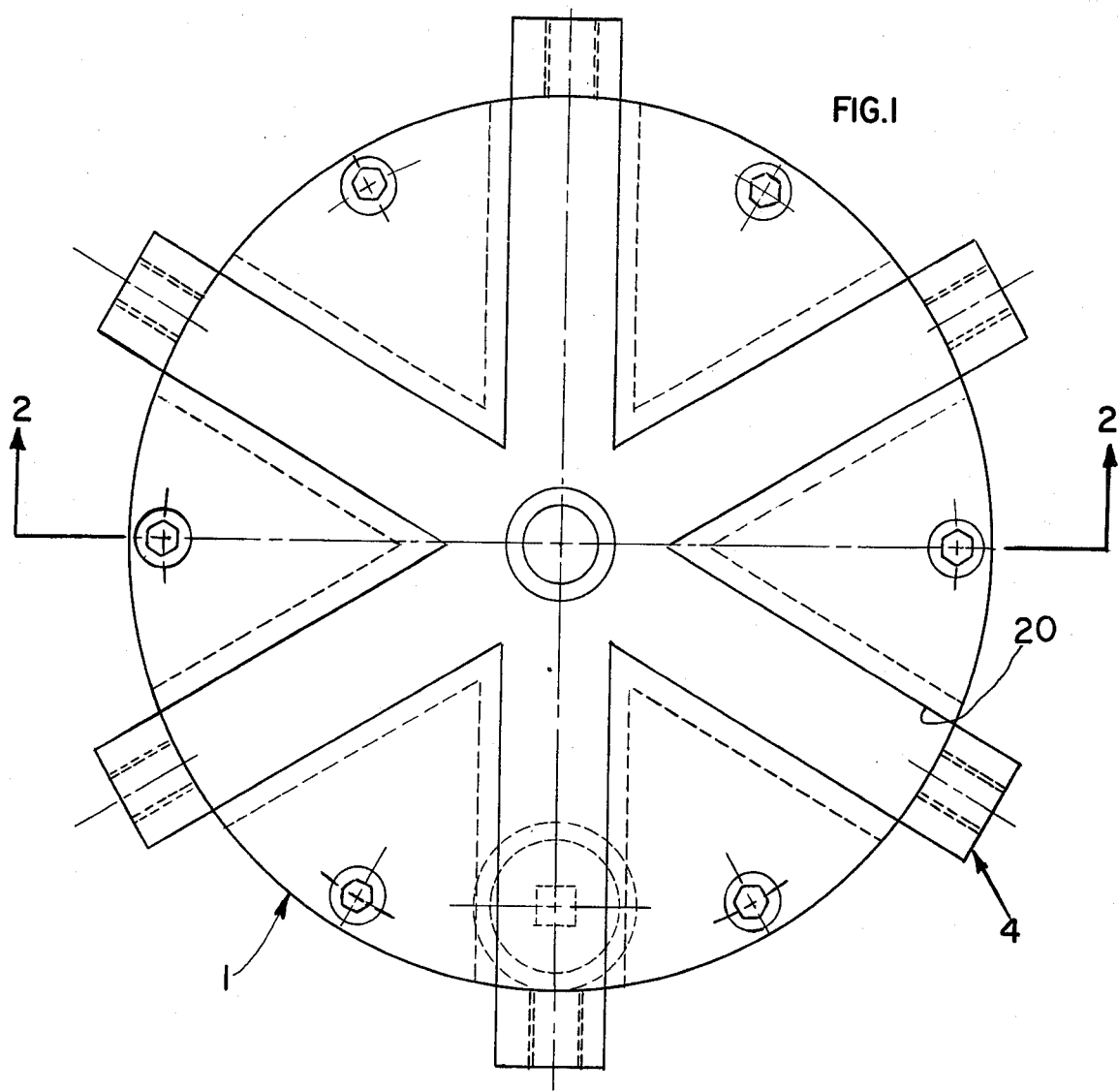
FIG. 1 is a front, or face, elevational view of the mechanical concentric support device without adapters.

While only the preferred forms of the present invention have been shown here, it should be understood that various changes or modifications may be made within the scope of the claims attached hereto, without departing from the spirit of the invention.

DESCRIPTION OF THE PREFERRED EMBODIMENTS

The mechanical concentric support device of the present invention includes a generally circular-cylindric housing 2 adapted for axial support on a machine tool, support shafts 4 radially slidably borne by the housing 2 adjacent to the circular face of the housing 2 formed by the cover plate 1, a scroll mechanism 3 contained within the housing 2 and engaged with the support shafts 4 to cause their radial motion on its rotation, and a drive means generally indicated at 10, borne by the housing 2 and the scroll mechanism 3, for causing relative rotation between the scroll 3 and the housing 2 about the axis of the housing 2. The drive means 10 includes a connector generally indicated at 11, located on one of the circular faces of the housing 2, for transmitting motion from outside the housing 2 to the scroll mechanism within.

As here shown, six of the support shafts 4 protrude radially outward from the housing 2, but it may be readily appreciated that the number of such shafts can be varied from three upward. The radially outermost ends of the support shafts 4 either support the workpiece directly by engaging the inner surface of the workpiece, or engage it by adapters shown in FIGS. 5 through 8, threadably engaged with the outermost ends of the support shafts 4. The support shafts 4 extend through the cylindric surface 12 of the housing 2 and are formed with a rack 13 along an elongate surface of the shaft 4, comprised of gear teeth shaped and dimensioned for driving engagement with the scroll mechanism 3 within the housing 2. The scroll mechanism 2 is formed with a spirally leading groove in one face for engagement with the rack 14 of each support shaft 4 in a manner well understood in the art.

Figure 3:
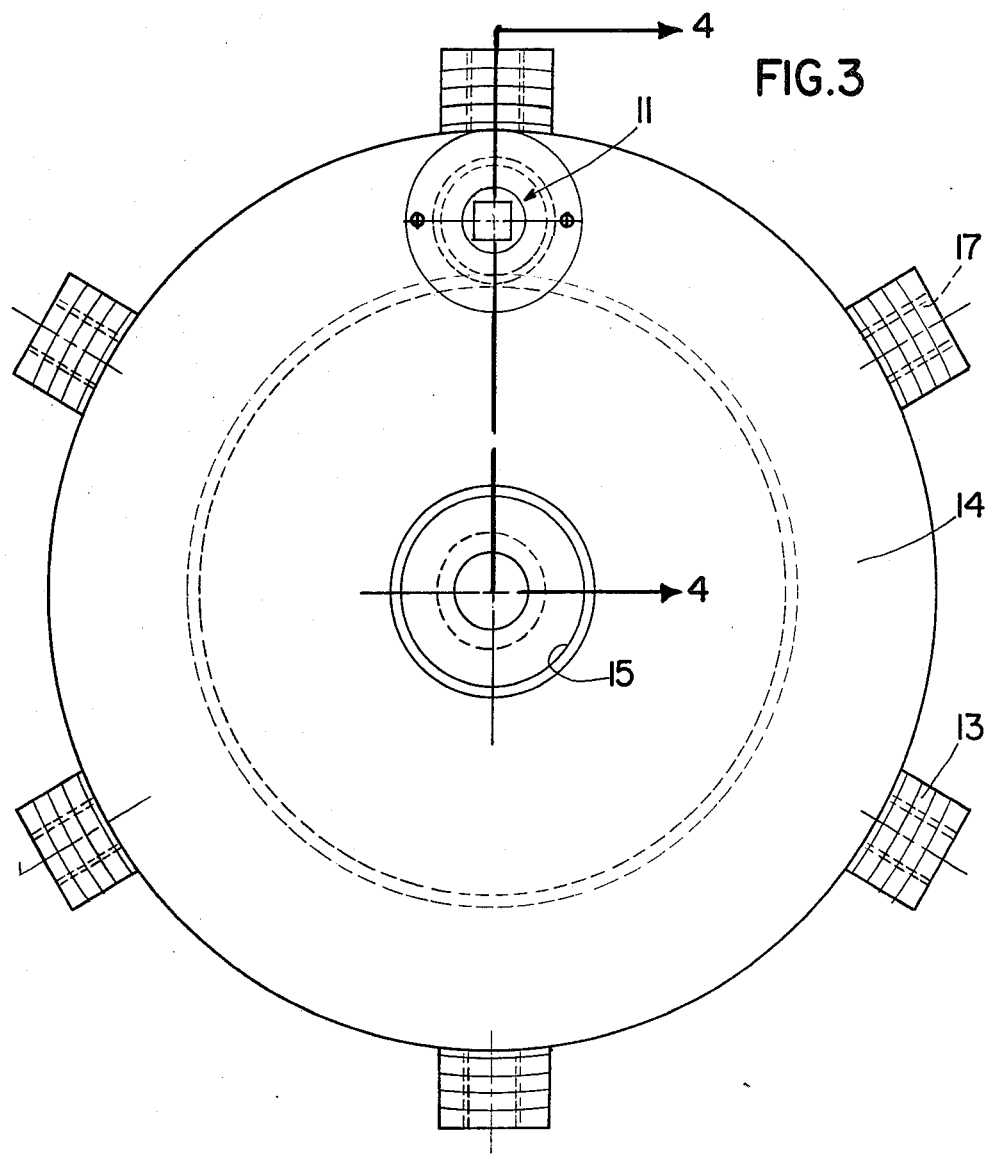
FIG. 3 is a rear elevational view of the device of FIG. 1.

The connector 11 is preferably located on the rear circular face 14 of the housing 2 as shown in FIG. 3. This location, on the circular face opposite to the face formed by the cover plate 1, allows the most convenient access to it by a machine operator using a tool such as the hand wrench shown at 8, even when the body of the housing 2 is mostly or entirely within the workpiece. The rear circular face 14 of the housing 2 is adapted for connection axially of the housing 2 by a recess shown at 15 therein, for receiving a mating shaft end of an appropriate machine tool. The radial location of the connector 11 is adjacent or nearly adjacent to the outer edge of the rear face 14 so that it may be conveniently reached by insertion of the wrench 8 approximately parallel to the axis of the housing 2 while having the greatest chance of clearing any obstructing portions of the machine tool on which the support device is mounted and the workpiece itself.

The drive means 10 also includes a ring spur gear 5 concentrically mounted on the scroll mechanism 3 and a driving spur gear 7 mounted axially on the inner end of a shaft 16 which forms part of the connector 11 and engaged with the ring spur gear 5. The shaft 16 is journalled through the rear circular face 14 by a sleeve bearing 6 for rotation about an axis parallel to and offset from the axis of the housing 2. The outer end of the shaft 16 is formed into the connector 11, so that a wrench such as that shown at 8 may be engaged with the connector 11 to rotate the scroll mechanism 3 relative to the housing 2.

The radially outermost portions of the support shafts are threaded internally as shown at 17 to receive the adapters shown in FIGS. 5 through 8. The radially outermost portions of the support shafts 4 may contact the workpiece directly, without use of adapters, for some applications, or they may be machined to a particular curvature in the manner of soft jaws for that purpose. Alternatively, the adapters shown in FIGS. 5 through 8 may be used for the varying work setups described below. In the case of the adapters shown in FIGS. 7 and 8, the adapter is formed with an integral threaded stud 22 mating with the threaded hole 17. The adapters of FIGS. 5 and 6 are meant to be secured to the outer ends of the support shafts 4 by an appropriate bolt (not shown) mating with the threaded hole 17 and extending through the hole 23 shown in FIGS. 5 and 6.

The adapter of FIG. 5 extends parallel to and outside the cover plate 1, and radially inward from the outer end of the support shaft 4. This adapter allows engagement of the mechanical support device of the present invention with the internal surfaces of workpieces of internal dimension smaller than the outside diameter of the housing 2. In this application, the surface of the adapter indicated at 18 contacts the workpiece. The adapter shown in FIG. 6 is meant for external gripping of workpieces at the contact surface 19.

Figure 2:
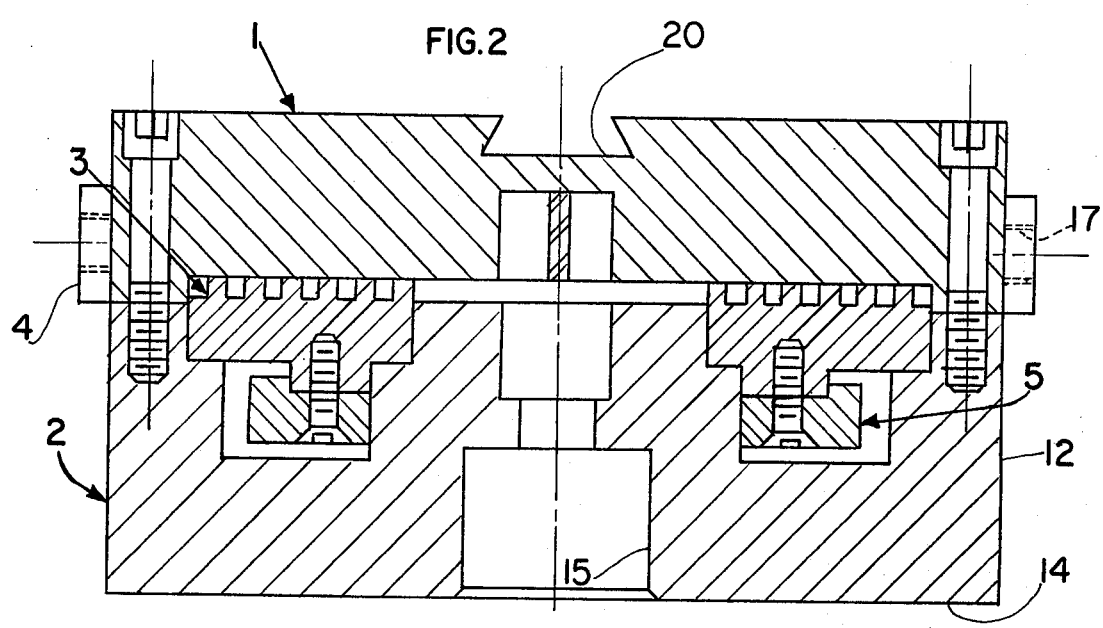
FIG. 2 is a diametric cross-sectional view of the device of FIG. 1, taken approximately along the sectional lines indicated by the arrows in FIG. 1.
Figure 4:
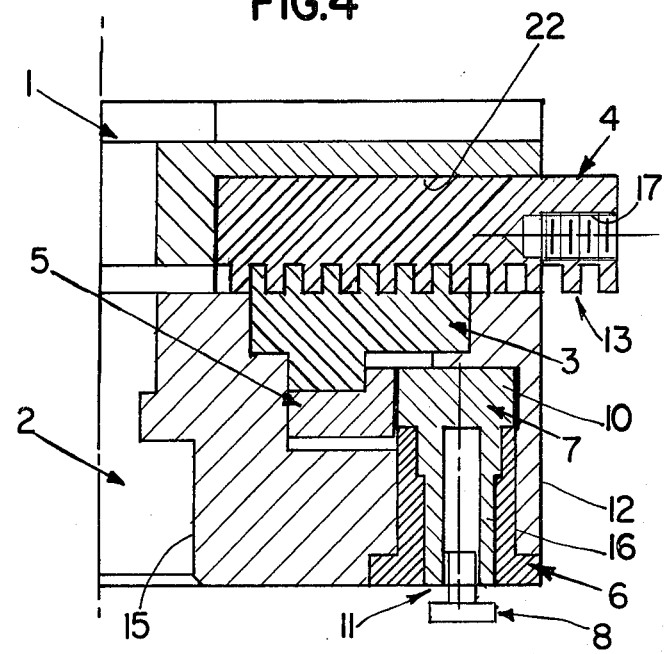
FIG. 4 is a partial cross-sectional view of the device of FIG. 3, taken approximately along the section lines indicated by the arrows in FIG. 3 and rotated ninety degrees clockwise about the axis of the device.

For use with the adapters of FIGS. 5 and 6, the exterior face of the coverplate 1 is provided with dovetail ways 20 formed therein, extending radially and parallel to the support shafts 4. The dovetail ways 20 receive dovetail portions 21 on the adapters which mate closely with them to constrain the adapters against movement in any direction but the radial direction. The dovetail ways 20 are axially offset from the support shafts 4, and the support shafts 4 are further constrained against motion other than radial by being themselves slideably mounted in closely fitting radial guide slots 24 formed on the interior surface of the cover plate 1, paralleling the dovetail ways 20, as shown in FIG. 2 and FIG. 4. The combined effect of the dovetail ways 20 and the radial guide slots 24 enhances the accuracy of machining when the adapters of FIGS. 5 and 6 are used.

The adapter of FIG. 7 is intended for extension of the reach of the support shaft 4, for use with larger diameter workpieces. The adapter of FIG. 8 has two uses; it may be used for improved strength of gripping engagement with the internal surface of the workpiece when the support device of the present invention is used at the driving end of a machine tool, such as the headstock of a lathe, and it may also be used with workpieces having irregular or rough internal surfaces to be gripped.

In use, the concentric support device is mounted on a machine tool, such as the tailstock quill of a lathe. Its use is by no means confined to lathes, but it is described in that connection for illustration here; it will be readily appreciated that it may also be applied at the driving or the dead ends of other machine tools such as precision grinders, milling machines, shapers and the like, or in gauging applications. Taking for example a hollow cylindric workpiece of internal diameter larger than the housing 2, the workpiece might already be suitably engaged at the headstock end of the lathe, and the tailstock quill of the lathe, bearing the support device with the support shafts 4 retracted, advanced to place the support device partially or entirely within the workpiece. A wrench such as that shown at 8 would then be slipped in between the workpiece and the machine tool, parallel (generally) to the axis of the housing 2 and engaged with the connector 11 to rotate the scroll mechanism 3 and drive the support shafts 4 radially outward into contact with the interior surface of the workpiece. This arrangement makes possible the machining of the planar annular face of the workpiece and even the interior surface of the workpiece if the support device is placed somewhat inward from the end of the workpiece. With long cylindric workpieces, the machining operations just described have been hitherto difficult or entirely impossible.

The support device of the present invention may also be used at the headstock or driving end of a lathe or similar machine tool, or two of the support devices may be used to support a workpiece at two points along its length. For smaller diameter workpieces, the adapters of FIG. 5 are engaged with their dovetail portions 21 sliding in the dovetail ways 20 and bolted to the outer ends of the support shafts 4. The surface 18 of the adapter then contacts the internal surface of the workpiece. For external gripping, the adapter of FIG. 6 is engaged slideably in the dovetail ways 20 and similarly bolted to the outer ends of the support shafts 4. The gripping surface of the adapter is then at 19. For very large workpieces, the support shafts are extended radially outward by the adapters of FIG. 7, threaded into the internally threaded hole 17. The adapters of FIG. 8 are similarly attached to the outer ends of the support shafts for use when the gripping contact must be more secure, as at the driving end of the machine tool, or when the interior surface of the workpiece is irregular or rough.

From the foregoing, it may be seen that a mechanical concentric support device has been provided having very free access to the key connector for scroll operation so that a workpiece may be internally supported for either internal, external or end-in machining adjacent to the support device. The support device is also adapted for easy change to accurate external support of the workpiece, and accommodates a wide range of sizes of workpieces.

I claim:

1. A mechanical concentric support device for a workpiece, comprising:

a generally circular-cylindric housing adapted for support axially of said housing on a machine tool and having first and second circular faces, support shafts radially slideably borne by said housing adjacent to said first circular face of said housing, a scroll mechanism contained within said housing and engaged with each of said support shafts to cause radial motion of said support shafts upon rotation of said scroll mechanism about the axis of said housing, drive means borne by said housing and said scroll mechanism for causing relative rotation of said scroll mechanism with respect to said housing about the axis of said housing, said drive means comprising a connector for transmitting motion from outside said housing to said scroll mechanism, said connector being located on one of the circular faces of said housing, a ring spur gear mounted on said scroll mechanism concentric to the axis of said scroll mechanism and said housing, a driving spur gear engaged with said ring spur gear, and a shaft journalled through one of the circular faces of said housing parallel with and offset from the axis thereof, and adjacent to the cylindric surface of said housing, said driving spur gear being axially mounted on said shaft internally of said housing and said connector being formed as the end of said shaft opposite said driving spur gear, for engagement by an appropriate tool mating with said connector to rotate said scroll mechanism with respect to said housing, and adapters threadably engageable with the radially outermost portion of said support shafts and extending radially parallel with the elongate dimension of said support shafts, said first circular face of said housing being formed with radially extending guide slots in the interior surface thereof for limiting said support shafts to radial sliding motion, the exterior surface of said first circular face being formed with radially extending dovetail ways parallel to said guide slots and axially offset therefrom, said adapters being formed with dovetail portions extending along the elongate dimension thereof for mating with said dovetail ways to constrain said adapters to radial sliding motion.

* * * * *